Figure 1:
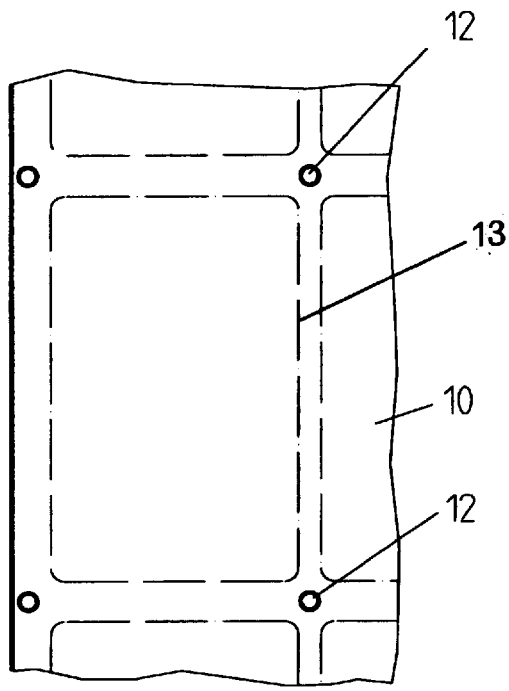

United States Patent
Melzer et al.

[11] Patent Number: 6,139,664
[45] Date of Patent: Oct. 31, 2000

[54] PROCESS FOR PRODUCING PLASTIC CARDS

[75] Inventors: Rainer Melzer; Roland Melzer, both of Schwelm, Germany

[73] Assignee: Melzer Maschinenbau GmbH, Germany

[21] Appl. No.: 09/214,587

[22] PCT Filed: Feb. 2, 1998

[86] PCT No.: PCT/EP98/02604

§ 371 Date: May 21, 1999

§ 102(e) Date: May 21, 1999

[87] PCT Pub. No.: WO98/50883

PCT Pub. Date: Nov. 12, 1998

[30] Foreign Application Priority Data

May 7, 1997 [DE] Germany ............... 197 19 271

[51] Int. Cl.⁷ ................................ B32B 31/00
[52] U.S. Cl. ............... 156/73.1; 156/252; 156/261; 156/290; 156/292; 156/308.2
[58] Field of Search ................ 156/73.1, 250, 156/252, 261, 290, 292, 308.2

[56] References Cited

U.S. PATENT DOCUMENTS 4,863,546  9/1989  Melzer et al. ............... 156/308.2
5,779,125  7/1998  Melzer et al. ............... 226/55
6,019,268  2/2000  Melzer et al. ............... 226/35

FOREIGN PATENT DOCUMENTS 19509233     9/1996  Germany.
WO 96/10803  4/1996  WIPO.

*Primary Examiner*—James Sells
*Attorney, Agent, or Firm*—Townsend and Townsend and Crew LLP

[57] ABSTRACT

The invention relates to a method of producing plastic cards with a layer structure, in each of which cards a flat coil and a chip which is connected thereto are embedded, these components being placed on a first web, to which a subsequent web for accommodating apertures for the components and at least one covering web are applied, which webs are then joined together by lamination so as to form a final web, out of which plastic cards are stamped. In order to simplify such a method, it is envisaged that a second web, which is placed on the first web, is held on a selectable web section of the latter by means of fixing points, while an aperture which is to accommodate the flat coil is made in the second web, for which purpose the fixing points are distributed in such a manner that they are arranged on both sides next to a part of the web which corresponds to a shape of the flat coil, and then the flat coil, in order to be placed on the first web, is inserted into the aperture formed in this way and the chip is inserted into a web which is provided with a chip opening.

20 Claims, 3 Drawing Sheets

PROCESS FOR PRODUCING PLASTIC CARDS

The invention relates to a method of producing plastic cards in accordance with the preamble of patent claim 1.

A method of this kind is known from DE 195 09 233 A1. According to this method, first of all a first web is provided with electronic components in the form of a chip with a prefabricated flat coil which can be connected to it and has a plurality of windings. It is sensible to apply the electronic components, with which this first web is fitted, in advance, so as to form a so-called carrier web. The components are preferably attached by means of an adhesive. The carrier web which has been prefabricated in this way is then supplied to a method of producing chip cards in which this carrier web is incorporated into a layer structure comprising a plurality of webs. To do this, a second web which has apertures for accommodating the electronic components is applied to the carrier web. Then, in a further method step, filler material is introduced into the apertures and smoothed down. A covering web which is provided on at least one side completes the layer structure which is ultimately to be laminated. The effort involved in prefabricating the webs is high. Furthermore, this prefabrication does not allow any different arrangement of the electronic components in a chip card.

WO 96/10803 has disclosed a carrier arrangement which is to be installed in a contactless chip card, in which an endless carrier film is provided with a layer of adhesive to which a multiplicity of transponder units containing a chip and a coil are applied. This arrangement is hermetically packaged by means of a covering film, cutouts in the covering film advantageously being provided in the region of the semiconductor chips. The carrier arrangement comprising transponder units packaged between two films is advantageously wound onto a roll in order to be transported further. In this case too, the need to incorporate a prefitted carrier web is a disadvantage.

To create space in a card body for accommodating the coil and the chip, it is also impossible to hot-press a recess in the case of material which is in the plastic state when warm, such as polyvinyl chloride, since the surface would swell locally and a printed image which may be present on webs laminated on would become distorted.

Therefore, the object of the invention is to provide a method of producing plastic cards according to the preamble of patent claim 1 which operates with a high throughput, a low outlay on machinery and a low reject rate.

The solution according to the invention to this object is defined by patent claim 1. The other claims relate to advantageous refinements of the concept of the invention.

The result is a method which avoids having to incorporate prefitted carrier webs. Rather, the fitting of the components is integrated in the production process of the chip cards. Matching and alignment problems caused by prefabricated carrier webs are eliminated. It is also possible to separate out defective electronic components without also having to get rid of sections of web.

Spots of adhesive or weld spots may be used as the fixing points. Since the number of fixing points can be selected to be low, according to the method of the invention, the spots of adhesive or weld spots do not interfere with the subsequent lamination operation.

If spots of adhesive are used as the fixing points, it is possible, by selecting a suitable adhesive, for the adhesive effect at a spot of adhesive to be exerted repeatedly. This allows first spots of adhesive to take on a dual role, namely to temporarily fix a stamped-out part of the web and, after this part of the web has been removed, to secure a flat coil which is inserted into the area where the piece of web has been removed. So-called autoadhesive agents are preferred.

Figure 3:
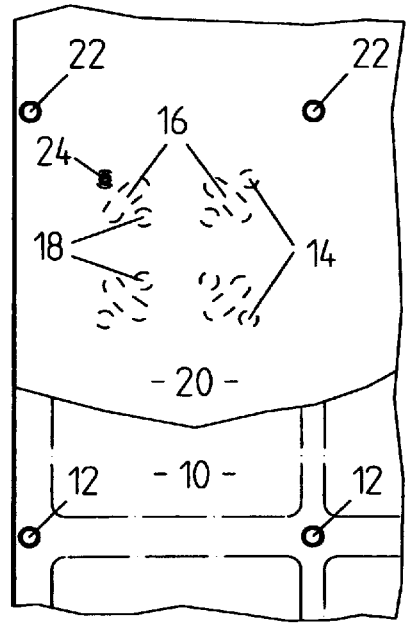
Figure 2:
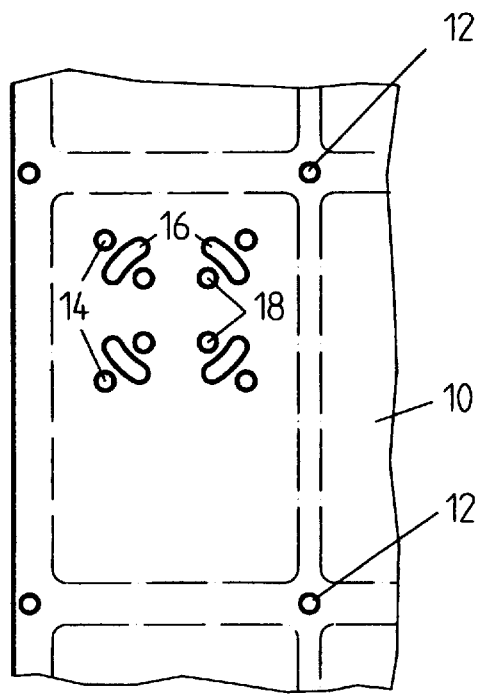
Figure 4:
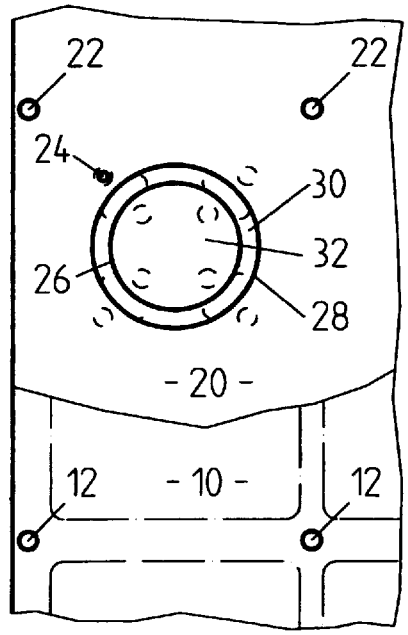
Figure 5:
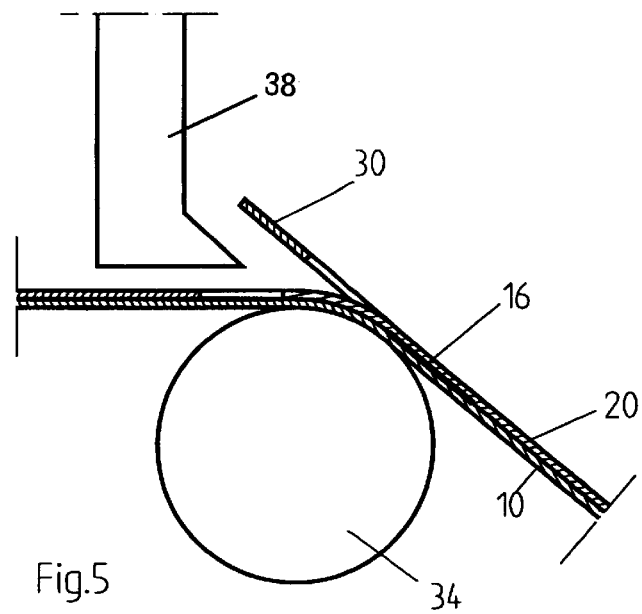
Figure 6:
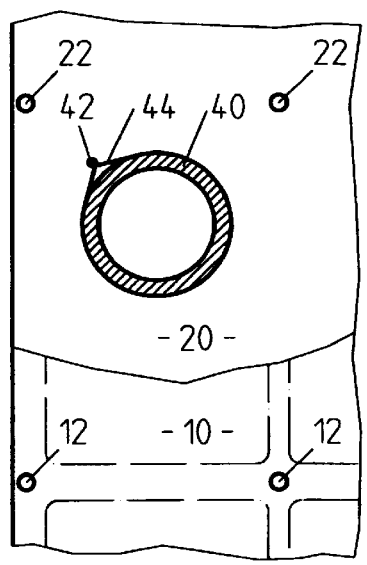
Figure 7:
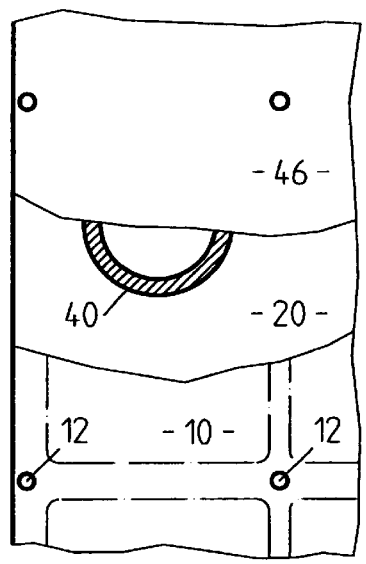
Figure 8:
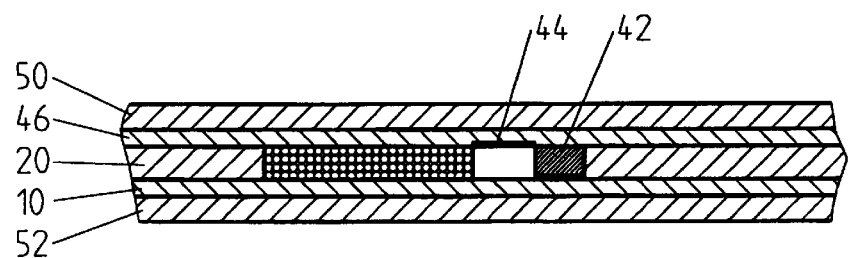
Figure 9:
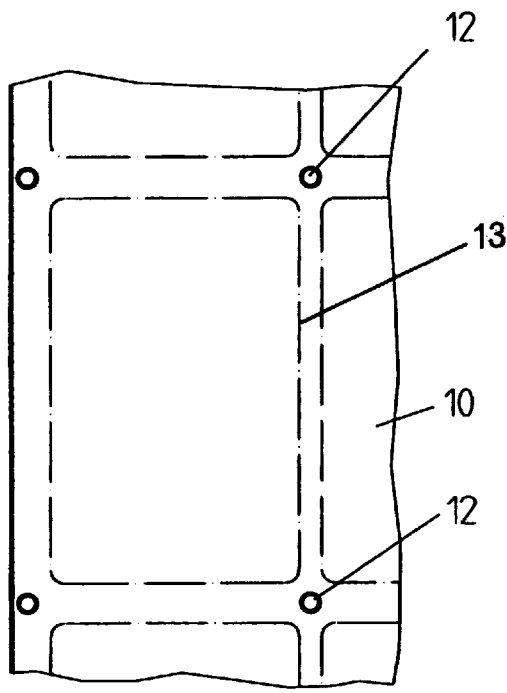
Figure 10:
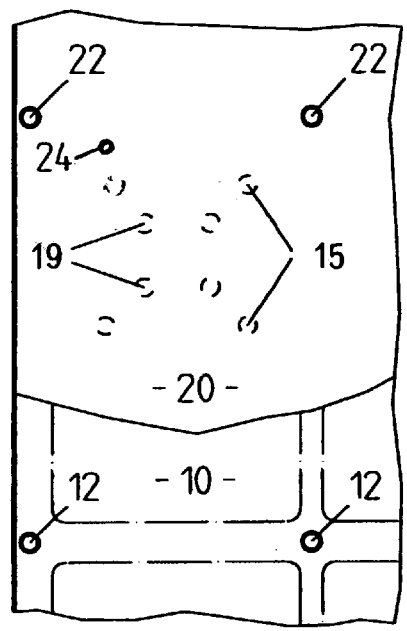
Figure 11:
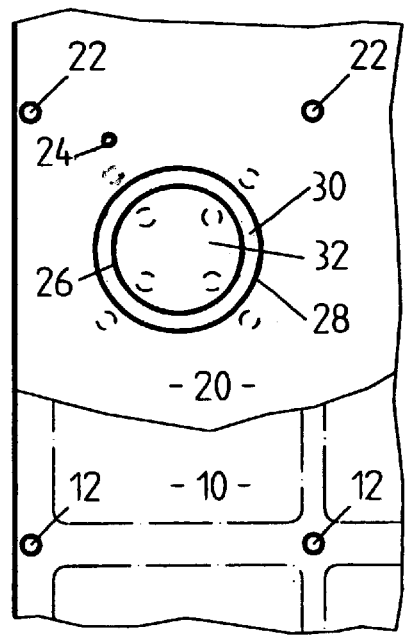

Further features and advantages of the invention will emerge from the following description of an exemplary embodiment, in which reference is made to the appended drawings, in which:

FIG. 1 shows a plan view of part of a first web, before adhesive is applied, in accordance with a first exemplary embodiment, FIG. 2 shows the first web in accordance with FIG. 1 after the adhesive has been applied, FIG. 3 shows the first web in accordance with FIG. 1 with a second web attached, FIG. 4 shows the webs in accordance with FIG. 3 following a stamping operation, FIG. 5 shows a side view of the webs in accordance with FIG. 3 in a following working station for removing a stamped area from the second web, FIG. 6 shows a plan view of the first and second webs with the coil and chip inserted, in accordance with the first exemplary embodiment, FIG. 7 shows a plan view of a semifinished product comprising first and second webs in accordance with FIG. 7, together with a third web, FIG. 8 shows a section through part of a finished card in accordance with the first exemplary embodiment, FIG. 9 shows a plan view of part of a first web before a second web is applied, in accordance with a second exemplary embodiment, FIG. 10 shows the first web in accordance with FIG. 9 with a second web which is attached by means of weld spots, FIG. 11 shows the webs in accordance with FIG. 10 following a stamping operation.

FIGS. 1 to 8 illustrate sections of a method of producing plastic cards having a chip and a flat coil which is connected to the chip, in accordance with a first exemplary embodiment. The flat coil is preferably one which has a plurality of wire windings.

FIG. 1 shows part of a first web 10. In the exemplary embodiment, the webs are unwound "endlessly" from reels; it should be noted, however, that the method according to the invention can also be carried out with single sheet webs. The first web 10 is provided with equidistant markings 12 which allow this first web 10 to be kept in register with further webs when producing plastic cards with a layer structure. The markings 12 are preferably holes which are formed in a precision stamping station. The first web has a thickness of, for example, 0.1 mm. An outline 13 of a card which is to be produced is indicated by dot-dashed lines.

The first web 10 is firstly provided with the markings 12 and then passes through a station in which adhesive is applied. This is preferably carried out using the screen printing process. The adhesive is an autoadhesive agent, a so-called self-adhesive agent, as is used, for example, for price labels and the like. Such an adhesive has a long-term adhesive action, i.e. after the adhesive bond has been detached by the bonded parts being pulled apart, this adhesive is again able to exert an adhesive effect.

Outer spots of adhesive 14, middle spots of adhesive 16 and inner spots of adhesive 18 are applied to a section of the first web 10 in the region of the outline 13 of a card which is to be produced, which region can be chosen as desired. The middle spots of adhesive 16 are distributed so as to match a shape of a flat coil 40 which is to be inserted (cf. FIG. 6). Since, according to the exemplary embodiment described here, the flat coil is designed as a ring, the middle spots of adhesive 16 lie on the circumference of a circle. Four middle spots of adhesive 16 are preferably provided. The size and shape of the spots of adhesive can be selected as desired, for example so as to form spots or arcs. However, the spots of adhesive 16 are discrete, individual spots which are spaced apart from one another. Not only would it be uneconomic to coat the entire area within the outer spots 14, or even only relatively large parts of this area, with adhesive, but also this would create a larger area in which the webs are not laminated together, because the adhesive acts as a parting layer.

Additional spots of adhesive, which are formed by outer spots of adhesive 14 and inner spots of adhesive 18, as seen in the direction of the outline 13 of a card, are applied next to the middle spots of adhesive 16 on both sides. The above statements relating to size and shape of the middle spots of adhesive 16 apply correspondingly to the outer and inner spots of adhesive 14, 18. Since the middle spots of adhesive 16, as is explained below, are used to secure the flat coil 40, while the outer and inner spots of adhesive 14, 18 are only intended to temporarily secure or fix two webs before these webs are joined together by lamination, these spots of adhesive 14, 18 are preferably small.

In a following operation, a second web 20, which has previously been provided with markings 22, is guided in register onto the first web 10 (cf. FIG. 3). The second web has a thickness which is preferably equal to a thickness of the flat coil 40 which is to be inserted, for example of 0.2 mm. An opening 24 for accommodating a chip 42 (cf. FIG. 6) may be made at the same time as the equidistant markings 22 on the second web or, as an alternative, in a separate operation.

In a subsequent operation, the result of which is shown in FIG. 4, two concentric cuts 26, 28 are made only in the second web, by means of a stamping tool, preferably by means of a strip steel punch. This stamping operation serves to form an aperture in the second web 20 in order subsequently to accommodate the flat coil 40 and attach it to the first web 10 using the middle spots of adhesive 16. The stamping operation therefore has to follow the shape and size of the flat coil 40. For this purpose, the circumferential size of and the spacing between the concentric cuts 26, 28 are matched to the flat coil 40 which is to be inserted. Furthermore, the stamping operation is to be carried out on a section of the second web 10 in that region of the outline 13 of a card to be produced which has been selected for the arrangement of the spots of adhesive 14, 16, 18, i.e. the stamping for the aperture of the flat coil and consequently the cuts 26, 28 surround the middle spots of adhesive 16. Consequently, the stamping for the aperture lies between the outer and inner spots of adhesive 14, 18.

During this operation for making an aperture in the second web 20 for the flat coil 40, the second web 20 is fixed to the first web 10 by the spots of adhesive 14, 16, 18. Consequently, the spots of adhesive 14, 16, 18 form fixing points which hold the second web 20 in position on the first web 10 during an operation in which an aperture for the flat coil 40 is made in the second web 20, i.e. the second web lies on top of the first web 10 when the aperture is being made. For this purpose, the spots of adhesive 14, 18 form fixing points which are distributed in such a manner that they are arranged on both sides next to a part of the web which corresponds to a shape of the flat coil.

The stamping depth can be accurately maintained, although no damage is caused if the first web 10 is also cut into. All that is necessary is to ensure that it is not cut through completely. After stamping, a ring 30 which has been cut out in this way, forming part of the second web 20, is still held on the first web 10 by means of the middle spots of adhesive 16. A part 32 of the second web 20 which is completely surrounded by the stamped section and is therefore separated from the second web 20 is held in place by the inner spots of adhesive 18. Furthermore, the first and second webs 10, 20 are held together in the vicinity of the outer cut 28 by the outer spots of adhesive 14.

The ring 30, which is delimited by the cuts 26, 28, is then removed from the second web 20. To do this, the webs 10 and 20, which are attached to one another, can be guided over a transverse rod 34, as shown in FIG. 5, with the result that the webs 10, 20 undergo a bending process. This makes it possible for a stamped-out region to lift up. If the middle spots of adhesive 16 have been distributed so that they are only present in a punctiform manner, the front 90° sector 36, as seen in the conveying direction, of the ring 30 projects out of the second web 20, since it is not held in place by adhesive over its entire surface, and can be taken hold of by a hook 38, from which it is then removed by means which are not shown. The ring 30 can be lifted off particularly successfully if the spots of adhesive 16 are not arranged at the top and bottom of a longitudinal axis of a card based on the outline 13.

The coil 40, which is inserted manually or mechanically, fits into an annular recess which is formed in this way. Also, the chip 42 can be fitted into the opening 24 intended for it and can be held in place by a spot of adhesive which can be provided beneath it. Connecting wires 44 between coil 40 and chip 42 simply lie on top of the second web 20. The coil 40 is fixed in place by the middle spots of adhesive, which have maintained an adhesive effect when the ring 30 is removed. The result of this operation is shown in FIG. 6, the coil 40 being indicated by hatching.

Next, a third web 46 can be guided in register onto the second web. The third web 46 may also be provided with adhesive (not shown), specifically in alignment with the spots of adhesive on the first web 10. Since the spots of adhesive are arranged symmetrically with respect to a center plane running in the conveying direction, the third web 46 may be provided with spots of adhesive on the same installation as the first web. The first and/or third webs 10, 46 may be provided with the adhesive while in stock and can then be stored until use, in which case the adhesive side is protected by a web of separating paper which is known from labels; the web of separating paper is pulled off before the adhesive bonding takes place and can be reused. It serves as one possible option for covering the spots of adhesive. The third web 46 has, for example, the same thickness as the first web 10, e.g. 0.1 mm.

The pattern of adhesive on the third web 46 may also be selected differently. Furthermore, the third web 46, which performs only a protective function, may also be omitted. As an alternative, the third web 46 may also serve to accommodate the chip 42, and to this end is then provided with a chip opening. Furthermore, the connecting wires 44 preferably lie in the third web 46.

The assembly which has been joined with adhesive can then be secured by weld spots. It can immediately be processed further to produce finished cards, for which purpose covering webs 50, 52 are fed in register onto the outer sides of the first and third webs 10, 46, or of the first and second webs 10, 20 if there is no third web 46. For this purpose, the covering webs 50, 52 have suitable markings which correspond to those of the other webs. The layer structure formed in this way is guided through a lamination device, as described, for example, in EP 134 820, in order to join together the individual webs to form a final web. Then, plastic cards, in each of which a chip 42 with flat coil 40 is embedded, are stamped out of the final web along the outline 13. A section through part of a card which has been produced in this way, in the region of coil and chip, is shown by FIG. 8.

As an alternative to arranging covering webs 50, 52 on both sides, it is also possible to provide such a covering web only on one side.

The various webs 10, 20, 46, 50, 52 each consist of a plastic material. Preferred plastic materials are PVC, polycarbonate and polyethylene.

However, it is also possible to produce the assembly of first, second and, if used, third webs 10, 20, 46 and to keep it in stock on reels. If the diameter of these reels is not less than 300 mm, or even 250 mm, it has been found, amazingly, that it is not possible to detect any damage to either the coil or its connection to the chip, and therefore the reject rate remains low. The assembly can therefore be produced at one site and then taken to a lamination installation, where the assembly is then treated as a standard web, i.e. a web which does not contain a coil with a chip.

As a modification to the method described above, the middle spots of adhesive 16 do not have to be applied, i.e. they may be dispensed with. This leads to the portion which is stamped out, in this case the ring 30, not adhering to the first web 10 since it is a separate piece of web. Since this stamped-out portion is removed in any case, it is possible to dispense with this interim fixing. In order to attach the flat coil 40, it is possible, before said coil is put in place, to apply adhesive to the first web 10 in the aperture which is formed by the stamped-out portion. As an alternative, the flat coil 40 may be held in place by attaching a covering web to the second web 20. The inner and outer spots of adhesive 14, 18 in a region which is close to the flat coil 40 which is to be accommodated by the aperture ensure that the aperture can be made with the correct dimensions.

FIGS. 9 to 11 illustrate sections of a method of producing plastic cards having a chip and a flat coil which is connected to the chip, in accordance with a second exemplary embodiment. The results of further method steps illustrated in FIGS. 6 to 8 apply correspondingly to the second exemplary embodiment, so that to this extent reference may be made to these FIGS. 6 to 8 in connection with FIGS. 9 to 11.

The second exemplary embodiment differs from the first exemplary embodiment in that the outer and inner spots of adhesive 14, 18 are replaced by outer and inner weld spots 15, 19. There are no middle fixing points. Furthermore, there is no outer weld spot 15 where an opening 24 for a chip is provided. An alternative outer weld spot may be added, or the opening 24 for the chip may be spatially shifted (FIG. 10).

According to the second exemplary embodiment, starting from a first web 10 in accordance with FIG. 9, which corresponds to the first web 10 illustrated and described in FIG. 1, a second web 20 is laid on the first web 10 in accordance with FIG. 9, leaving out the method step illustrated in FIG. 2. Then, outer fixing points 15 and inner fixing points 19 are put in place, which fixing points are in this case formed by weld spots, which join the first web 10 and the second web 20 together by limited local fusion between the two webs 10, 20. The fixing points, in the form of weld spots 15, 19, like the spots of adhesive 14, 18, are distributed in such a manner that they are arranged on both sides next to a part of the web which corresponds to a shape of the flat coil 40 (FIG. 6).

In a following operation, the result of which is illustrated in FIG. 11, two concentric cuts 26, 28 are made only in the second web, by means of a stamping tool, preferably by means of a strip steel punch. This stamping operation serves to form an aperture in the second web 20 which will subsequently accommodate the flat coil 40. Consequently, the stamping for the aperture lies between the outer and inner weld spots 15, 19. The statements made with regard to FIG. 4 apply correspondingly to this stamping operation.

The ring 30, which is delimited by the cuts 26, 28, is then removed from the second web 20. To do this, the webs 10 and 20, which are joined together, can be guided over a transverse rod 34, as shown in FIG. 5, with the result that the webs 10, 20 undergo a bending process This makes it possible for a stamped-out region to lift up out of the second web 20, since this region is not held by fixing points, and to be taken hold of by a hook 38, from which it is then removed by means which are not shown.

The coil 40, which is inserted manually or mechanically and then rests on the first web 10, fits into an annular recess which is formed in this way. The chip 42 may also be inserted into an opening 24 intended for this chip and may be held in place by a spot of adhesive which may be provided beneath it. Connecting wires 44 between coil 40 and chip 42 simply lie on top of the second web 20. The coil 40 may be fixed in place by a spot of adhesive which may be provided on the first web 10. As an alternative, the coil 40 may be held in place by a covering web, as is provided, for example, as web 46 and/or 50 in accordance with FIGS. 7 and 8 and has maintained an adhesive effect when the ring 30 is removed. The result of this operation is illustrated in FIG. 6, the coil 40 being indicated by means of hatching.

The weld spots 15, 19 may, for example, be applied by ultrasonic welding.

Otherwise, the statements made in connection with the first exemplary embodiment apply correspondingly.

What is claim is:

1. A method of producing plastic cards with a layer structure, in each of which cards a flat coil and a chip which is connected thereto are embedded, these components being placed on a first web, to which a subsequent web for accommodating apertures for the components and at least one covering web are applied, which webs are then joined together by lamination so as to form a final web, out of which plastic cards are stamped, wherein a second web, which is placed on the first web, is held on a selectable web section of the latter by means of fixing points, while an aperture which is to accommodate the flat coil is made in the second web, for which purpose the fixing points are distributed in such a manner that they are arranged on both sides next to a part of the web which corresponds to a shape of the flat coil, and then the flat coil, in order to be placed on the first web, is inserted into the aperture formed in this way and the chip is inserted into a web which is provided with a chip opening.

2. The method as claimed in claim 1, wherein spots of adhesive are used as the fixing points.

3. The method as claimed in claim 1, wherein firstly middle spots of adhesive, which are distributed so as to match a shape of the flat coil, are applied to the first web, and the fixing points, in the form of outer and inner spots of adhesive, are applied next to these middle spots of adhesive on both sides.

4. The method as claimed in claim 3, wherein the flat coil is fixed on the first web by means of the middle spots of adhesive.

5. The method as claimed in claim 2, wherein the adhesive is applied by the screen printing process.

6. The method as claimed in claim 2, wherein that side of the first web which is provided with spots of adhesive is provided with a cover until it is processed.

7. The method as claimed in claim 1, wherein weld spots are used as the fixing points.

8. The process as claimed in claim 7, wherein, in order to apply the weld spots, firstly the second web is laid on the first web, and then the weld spots are applied by locally fusing together the webs lying one above the other.

9. The method as claimed in claim 8, wherein the weld spots are applied by ultrasonic welding.

10. The method as claimed in claim 1, wherein the flat coil is fixed on the first web by applying a covering web to the second web.

11. The method as claimed in claim 1, wherein the fixing points are spaced apart from one another in such a manner that in each case three to six fixing points of this nature are distributed circumferentially on both sides next to the shape of a flat coil.

12. The method as claimed in claim 1, wherein the web which is provided with the chip opening is formed by the second web.

13. The method as claimed in claim 1, wherein the chip is fixed by means of adhesive beneath the chip opening.

14. The method as claimed in claim 1, wherein the aperture for the flat coil is made by stamping out a part of the web which corresponds to the shape of the flat coil.

15. The method as claimed in claim 1, wherein, in the event that a toroidal coil is used as the flat coil, the fixing points which are arranged on both sides are in each case arranged radially behind one another.

16. The method as claimed in claim 1, wherein the aperture is stamped out by means of a strip steel punch.

17. The method as claimed in claim 1, wherein a semi-finished product which is formed by the first and second webs, after the stamping, is curved about an axis which runs transversely to the extent of the web, and the ring, which consequently becomes partly free, is taken hold of and removed.

18. The method as claimed in claim 1, wherein, when the second web is being perforated to produce an aperture for the flat coil, a receiving opening for the chip is also made.

19. The method as claimed in claim 1, wherein the webs are provided at their edges with equidistant markings which are used to guide the individual webs together so that they are in register.

20. The method as claimed in claim 1, wherein a printed web is used as at least one covering web.

* * * * *